United States Patent [19]

Brook

[11] Patent Number: 4,577,708

[45] Date of Patent: Mar. 25, 1986

[54] WEIGHING APPARATUS

[75] Inventor: Richard M. Brook, Huddersfield, England

[73] Assignee: Autosystems Limited, Huddersfield, England

[21] Appl. No.: 641,590

[22] Filed: Aug. 17, 1984

[30] Foreign Application Priority Data

Sep. 2, 1983 [GB] United Kingdom ............. 8323557

[51] Int. Cl.⁴ .................... G01G 19/00; G01G 19/04; B65G 17/32

[52] U.S. Cl. ................................. 177/145; 177/163; 198/504; 198/680

[58] Field of Search ................... 177/50, 145, 163; 198/504, 505, 680

[56] References Cited

U.S. PATENT DOCUMENTS 4,420,051 12/1983 Furuta et al. ............. 198/504 X
4,488,635 12/1984 Linville ..................... 177/50 X Primary Examiner—George H. Miller, Jr.
Attorney, Agent, or Firm—Murray, Whisenhunt and Ferguson

[57] ABSTRACT

Apparatus for weighing a succession of articles comprises a plurality of article carriers, for example poultry carcass carrying hooks 19, interconnected, for example by a chain 16, for movement in succession along a path. A weighing device is positioned at a weighing station 22 and means are provided to lower each article carrier at the weighing station to apply load to the weighing device. The article carriers may for example be lowered as a result of being pressed downwardly by means of a dipping portion of rail 26. By lowering each article carrier during weighing, it is possible to weigh the article carried by the carrier without significantly changing the vertical position of the article with respect to adjacent articles, thus reducing the risk that the weight recorded will be inaccurate because of any drag applied by adjacent articles.

8 Claims, 1 Drawing Figure

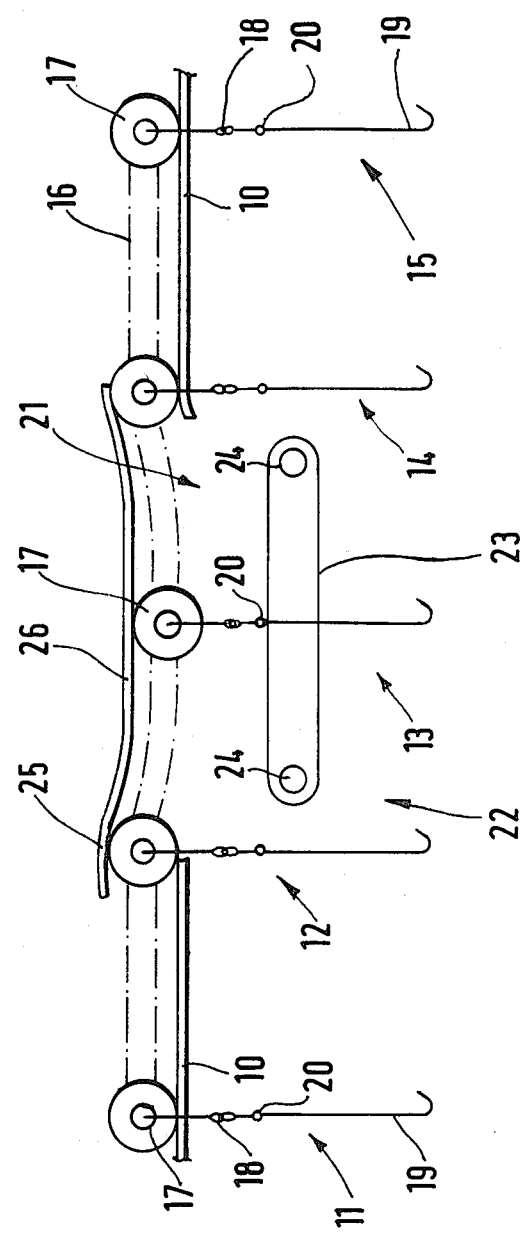

WEIGHING APPARATUS

BACKGROUND TO THE INVENTION

The invention relates to weighing apparatus and particularly to apparatus for weighing each of a succession of articles which are travelling along a path, for example a succession of articles being conveyed along a path by an overhead conveyor.

DESCRIPTION OF THE PRIOR ART

Such weighing apparatus is known, for example from our U.K. Pat. No. 1551701, in which the articles, e.g. poultry carcasses, are carried on shackles which are drawn in succession along a support rail by a chain to which the shackles are attached at evenly spaced locations. Weighing is carried out by causing the lower part of each shackle, together with the article carried thereby, to pass over a weighing device. During weighing the support rail must not of course provide any support and so the lower part of each shackle is caused to rise up, e.g. using a ramp device, thus removing the load from the rail and applying it to the weighing device.

However this raising of each article in order to weigh it can give rise to a problem, particularly if the article tends to be in contact with the preceding and/or succeeding article, as may well be the case with poultry carcasses, where the wing of one bird may catch on the wing of another, particularly if the shackles are closely spaced together, which may well be the case when high carcass processing rates are required.

If an article is in contact with one or more other articles when it is raised for weighing, the neighbouring article or articles resist the lift and cause a drag on the article being weighed thus causing the article to appear heavier than it really is.

We have realised that this problem could be solved if one could maintain all the articles in as near as possible the same relative vertical position to each other during the weighing operation.

SUMMARY OF THE INVENTION

Accordingly the invention provides apparatus for weighing a succession of articles comprising a plurality of article carriers interconnected for movement in succession along a path, a weighing device positioned at a weighing station on the path, and means for lowering each article carrier at the weighing station to apply load to the weighing device.

The article carriers may be interconnected by a chain, wire, rope or like flexible member and each article carrier may be lowered at the weighing station by causing the flexible member to follow a path which dips downwardly at the weighing station.

The flexible member may be under tension, at least at the weighing stage, and be caused to dip downwardly by a deflection device.

Preferably the deflection device acts on the article carriers.

The article carriers may be pulled along a support rail, by the flexible member, the support rail being interrupted at the weighing station to permit the article carriers and flexible member to be deflected downwardly.

The deflection device may comprise a dipping portion of rail which acts on the upper surface of the article carriers.

Each article carrier may comprise a shackle, for example a poultry carcass carrying shackle.

By way of example, specific embodiments of the invention will now be described.

BRIEF DESCRIPTION OF THE DRAWING

FIG. 1 is a diagrammatic side view of an embodiment of weighing apparatus according to the invention.

DESCRIPTION OF THE EMBODIMENT OF THE INVENTION

The weighing apparaus incorporates a conveyor system which includes a support rail 10. A plurality of poultry carcass carrying shackles 11, 12, 13, 14 and 15 are drawn along the rail by a chain 16 to which the shackles are attached at spaced-apart intervals.

The shackles are similar to those illustrated in our U.K. Pat. No. 1551701, comprising a wheeled carriage 17 to which is linked, by a pair of eyes 18, a poultry carcass carrying hook 19. Each hook carries a horizontally extending rod 20 near its upper end.

Apart from an interrupted region 21 the rail 10 is continuous, as is the chain 16.

The interrupted region 21 is positioned at a weighing station 22 where a continuous belt 23 is positioned slightly below the rail 10. The continuous belt 23, which runs around pulleys 24, is suspended from an electronic weigh cell (not shown).

As each shackle, together with any poultry carcass carried thereby, approaches the belt 23, the load of the poultry carcass carrying hook, together with any carcass carried thereby, is applied to the belt 23 and hence to the weigh cell.

The way in which the lower part of each shackle is carried over the belt 23 and is consequently weighed is identical to that described in our U.K. Pat. No. 1551701. However with the apparatus described in that Patent, the load was applied to the continuous belt by causing each shackle to ride up an inclined ramp.

Raising the shackle in this way can give rise to problems as a poultry carcass may be in contact with neighbouring carcasses which impart drag to the carcass being weighed. With the embodiment of the present invention illustrated in FIG. 1, the poultry carcasses all remain at substantially the same height, and the load of one carcass is applied to the belt 23 by lowering the associated carriage 17, instead of by raising the poultry carcass carrying hook.

The chain 16 is under tension and so in order to lower each carriage 17 as it passes above the belt 23, a second portion of rail 25 is positioned at the weighing station, the central portion 26 dipping downwardly to deflect the carriages downwardly in succession. Thus, as viewed in FIG. 1, the carriage 17 of shackle 13 has been pressed downwardly by the dipping rail portion 26. Since the horizontal rod 20 of the poultry carcass carrying hook is in contact with the belt 23 the lowering of the carriage 17 causes the weight of the hook and any poultry carcass carried thereby to be applied directly to the belt 23 and hence to the weigh cell. The pair of eyes 18 are interconnected with a certain amount of play so that when the carriage 17 dips downwardly the load of the poultry carcass carrying hook is no longer supported by the carriage 17. It is supported entirely by the belt 23.

The invention is not restricted to the details of the foregoing embodiment.

I claim:

1. Apparatus for weighing a succession of articles, said apparatus comprising:
   a weighing device positioned at a weighing station, said weighing device having a weighing surface;
   a plurality of article carriers, each said article carrier including a first part and an associated second part for carrying an article, said first and second parts being movable relative to each other in a vertical direction, said first parts being interconnected for moving said carriers through said weighing station, each said second part including a contact surface engageable with said weighing surface, each said contact surface and said weighing surface being in substantially the same plane in said weighing station;
   means for lowering each said first part in said weighing station when each said contact surface and said weighing surface are in contact with each other to thereby transfer to said weighing surface the weight of the article carried by the associated second part while maintaining adjacent second parts in said weighing station in the same vertical position with respect to each other, whereby physical interference between adjacent articles in the weighing station is minimised.

2. Apparatus as claimed in claim 1, in which the article carriers are interconnected by a chain, wire, rope or like flexible member, each article carrier being lowered at the weighing station by causing the flexible member to follow a path which dips downwardly at the weighing station.

3. Apparatus as claimed in claim 2, in which the flexible member is under tension, at least at the weighing stage, and is caused to dip downwardly by a deflection device.

4. Apparatus as claimed in claim 3, in which the deflection device acts on the article carriers.

5. Apparatus as claimed in claim 4, in which the article carriers are pulled along a support rail, by the flexible member, the support rail being interrupted at the weighing station to permit the article carriers and flexible member to be deflected downwardly.

6. Apparatus as claimed in claim 4, in which the deflection device comprises a dipping portion of rail which acts on the upper surface of the article carriers.

7. Apparatus as claimed in claim 1, in which each article carrier comprises a shackle.

8. Apparatus as claimed in claim 7, in which each shackle is adapted to carry a poultry carcass.

* * * * *